(12) United States Patent
Goldstein

(10) Patent No.: US 6,570,386 B2
(45) Date of Patent: May 27, 2003

(54) SYSTEM AND METHOD FOR PROVIDING POWER TO ELECTRICAL DEVICES

(75) Inventor: Tim Goldstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/918,179

(22) Filed: Jul. 30, 2001

(65) Prior Publication Data

US 2003/0020477 A1 Jan. 30, 2003

(51) Int. Cl.[7] ............... G01R 31/327; G08B 23/00
(52) U.S. Cl. ..................... 324/415; 340/575
(58) Field of Search ................. 324/415; 351/160 R, 351/219, 161; 340/575, 576; 257/221; 320/101

(56) References Cited

U.S. PATENT DOCUMENTS

| | | | |
|---|---|---|---|
| 5,373,412 A | 12/1994 | Dousse | 361/93.2 |
| 5,387,858 A | 2/1995 | Bender et al. | 320/61 |
| 5,566,067 A | 10/1996 | Hobson et al. | 702/75 |
| 5,682,144 A * | 10/1997 | Mannik | 257/221 |
| 5,936,380 A | 8/1999 | Parrish | 320/101 |
| 5,959,818 A | 9/1999 | Blakely | 361/93.5 |
| 6,087,941 A * | 7/2000 | Ferraz | 340/575 |
| 6,166,515 A | 12/2000 | Barde et al. | 320/101 |
| 6,190,314 B1 | 2/2001 | Ark et al. | 600/300 |
| 6,259,372 B1 | 7/2001 | Taranowski et al. | 340/683 |

FOREIGN PATENT DOCUMENTS

| | | |
|---|---|---|
| EP | 0 460 320 A2 | 11/1991 |
| GB | 2 364 809 A | 6/2002 |
| JP | 8047184 | 2/1996 |
| JP | 10236211 | 9/1998 |

* cited by examiner

Primary Examiner—N. Le
Assistant Examiner—James C. Kerveros

(57) ABSTRACT

An apparatus including an electronic component, a sensing element, a power supply element, and logic. The sensing element is coupled to the electronic component. The sensing element is configured to sense an occurrence of an event and to transmit a data signal indicative of the occurrence. The power supply element is configured to receive energy from the sensing element and to power the electronic component with electrical energy. The electrical energy is derived from the energy received from the sensing element. The logic is configured to receive the data signal from the sensing element and to control operation of a component of the system based on a value of the data signal.

22 Claims, 5 Drawing Sheets

SYSTEM AND METHOD FOR PROVIDING POWER TO ELECTRICAL DEVICES

BACKGROUND OF THE INVENTION

1. Field of the Invention

The present invention generally relates to power generation techniques and, in particular, to a system and method for providing power to components of electrical devices.

2. Related Art

Micro-level and nano-level fabrication techniques make it possible to manufacture electronic and/or mechanical devices on an extremely small scale. Indeed, utilizing conventional micro-fabrication techniques, it is presently possible to manufacture commercial electronic and/or mechanical devices having dimensions of just a few microns. With the introduction of nano-technology, it is envisioned that the size of certain electronic and/or mechanical devices can be even further reduced. It is well recognized that utilization of micro-fabrication and/or nano-fabrication to produce devices of an extremely small scale is advantageous in many applications for reducing manufacturing costs and/or increasing device performance.

Most micro-fabricated and/or nano-fabricated devices require electrical power for operation. However, as the sizes of such devices are further reduced as manufacturing techniques improve, it becomes more difficult to include a suitable power source in these devices.

In many instances, a small battery is employed to provide power to the components of a micro-fabricated device. However, the operational life of a conventional battery is limited, and a conventional battery employed within a particular device eventually must be replaced if operation of the particular device is to continue. Moreover, replacing a battery in a small-scale device, such as a micro-fabricated and/or nano-fabricated device, can be difficult and/or costly, if at all possible.

SUMMARY OF THE INVENTION

Generally, the present invention provides a system and method for providing electrical power to components of electrical devices.

An apparatus in accordance with the present invention comprises an electronic component, a sensing element, a power supply element, and logic. The sensing element is coupled to the electronic component. The sensing element is configured to sense an occurrence of an event and to transmit a data signal indicative of the occurrence. The power supply element is configured to receive energy from the sensing element and to power the electronic component with electrical energy. The electrical energy is derived from the energy received from the sensing element. The logic is configured to receive the data signal from the sensing element and to control operation of a component of the system based on a value of the data signal.

The present invention can also be viewed as providing a method for powering components of electrical devices. The method can be broadly conceptualized by the following steps: providing an apparatus having a sensing element and an electronic component; sensing an occurrence of an event via the sensing element; transmitting a data signal from the sensing element in response to the occurrence; controlling the apparatus based on a value of the data signal; harnessing electrical energy via the sensing element; and providing the electrical energy to the electronic component.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
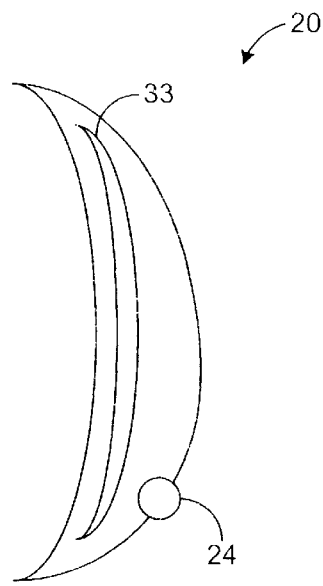
FIG. 1 is a diagram illustrating a side view of an embodiment of an apparatus, more specifically, a contact lens, in accordance with the present invention.
Figure 2:
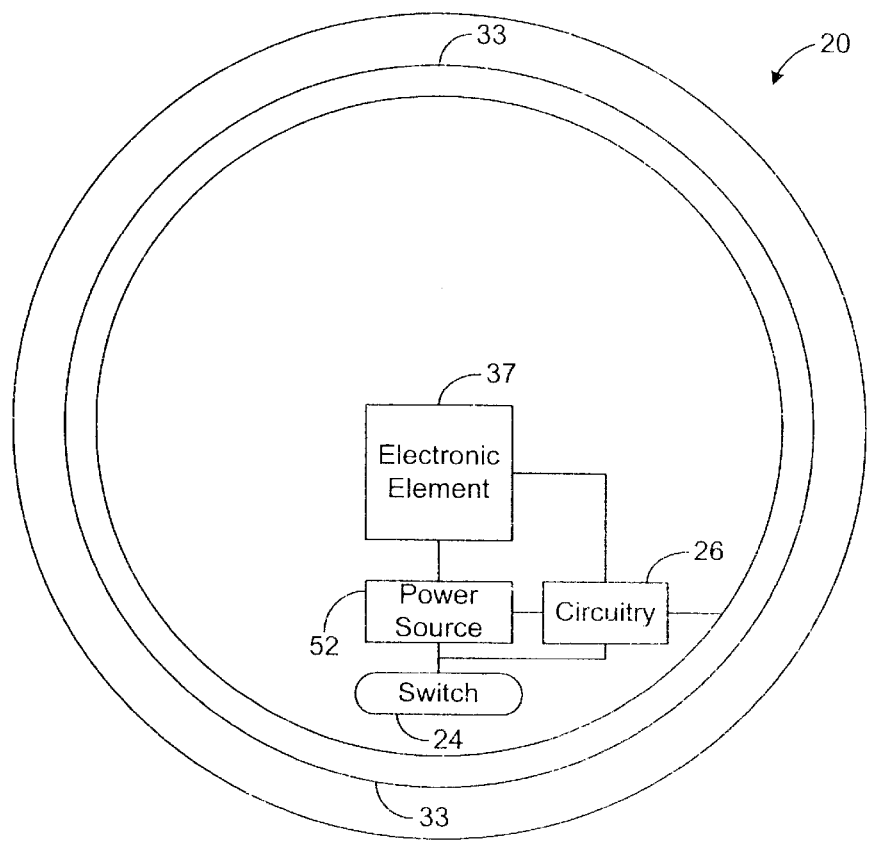
FIG. 2 is a diagram illustrating a front view of the apparatus of FIG. 1.

FIGS. 1 and 2 depict a contact lens 20 that includes various small (e.g., nano-level or micro-level) components for performing various functionality. Such a contact lens is described in more detail in commonly assigned U.S. patent application Ser. No. 09/918,211, entitled "System and Method for Controlling Electronic Devices" and filed concurrently herewith, which is incorporated herein by reference. The contact lens 20 shown by FIGS. 1 and 2 includes a mechanical switch 24 that is capable of detecting blinks of a user's eyelid. In this regard, the contact lens 20 may be worn on a user's eyeball, similar to other conventional contact lenses, and the switch 20 is preferably positioned such that the user's eyelid engages the switch 24 when the user blinks.

More specifically, when the user blinks, the user's eyelid passes over the surface of the contact lens 20 and eventually engages the switch 24. The switch 24 is configured to detect when the user's eyelid engages the switch 24 and is configured to provide an input to circuitry 26 indicating that the switch 24 has detected a blink in response to such a detection.

In the preferred embodiment, the switch 24 is a friction roller, although other types of devices may be used to implement the switch 24 in other embodiments. Thus, when the user blinks in the preferred embodiment, the user's eyelid eventually passes over the switch 24, and friction between the switch 24 and the user's eyelid causes the switch to move or, more specifically, to rotate as the user continues to close his or her eyelid. When the user's eyelid is opened, friction between the user's eyelid and the switch 24 causes the switch 24 to move in an opposite direction thereby returning the switch to its original position or state.

Logic or circuitry 26 preferably monitors the inputs provided by the switch 24 to determine when and/or how often the user blinks. The circuitry 26 may then utilize such information to provide input or control signals to an external electronic device (not shown), which operates based on the input or control signals transmitted from the circuitry 26. In order to communicate the input or control signals from the circuitry 26 to the external electronic device, the lens 20 may be coupled to an antenna 33, as shown by FIGS. 1 and 2. The antenna 33 preferably receives the input or control signals from the circuitry 26 and then wirelessly transmits these signals to the external electronic device.

As an example, assume that the lens 20 is employed within a camera system, which includes a camera (not shown) that takes a picture or begins to record a scene when the frequency of a user's blinks exceeds a threshold. In this regard, the camera may take a picture or begin recording a scene when the user rapidly blinks a particular number (e.g., three or more) times within a particular time period (e.g., two seconds). In such an embodiment, the circuitry 26 monitors when the switch 24 detects blinks and, based on the inputs provided by the switch 24, determines when the frequency of the user's blinks have exceeded the threshold. When the circuitry 26 determines that the frequency of the user's blinks have exceeded the threshold, the circuitry 26 then transmits, to the camera via the antenna 33, a control signal instructing the camera to take a picture or begin recording. In response to the control signal transmitted from the circuitry 26, the camera takes a picture or begins recording a scene.

Note that some of the functionality described above for the circuitry 26 may reside external to the lens 20. For example, the circuitry 26 may be configured to transmit, to the camera via the antenna 33, an input signal each time a blink is detected. Logic within the camera may then be configured to monitor when and/or how often the user blinks based on the input signals transmitted from the circuitry 26. Thus, the logic for determining when the user's blinking frequency has passed a predetermined threshold and, therefore, when the camera should take a picture or begin recording a scene is implemented by logic within the camera instead of the lens 20. Alternatively, the foregoing logic may reside within a device that is coupled to a convenient location, such as on the user's body or clothing. Note that any "logic" described herein may be implemented in hardware, software or a combination thereof.

Figure 3:
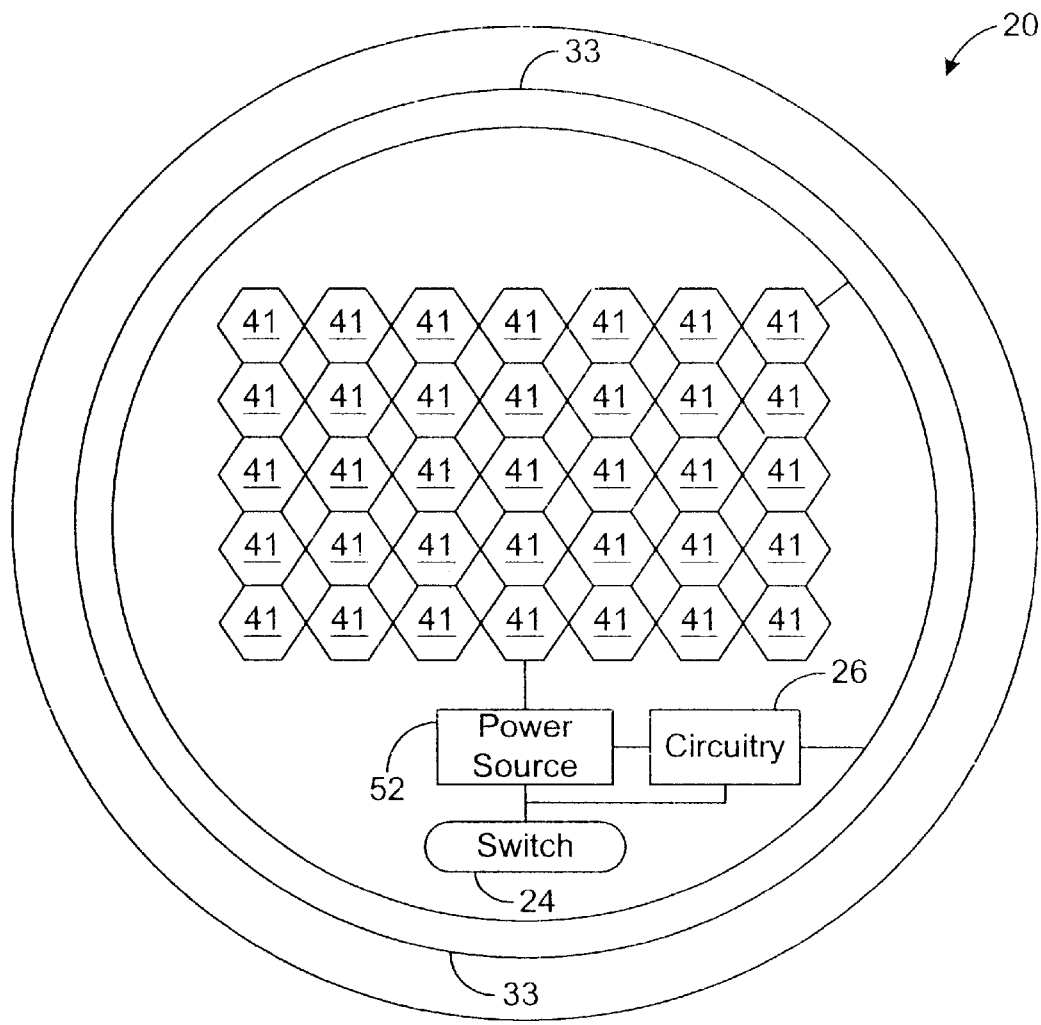
FIG. 3 is a diagram illustrating another embodiment of the apparatus depicted in FIG. 2.

The lens 20 may be coupled to one or more other electronic elements 37 that may be utilized to perform various functionality including, but not limited to, providing additional information to the circuitry 26 and/or to the external electronic device (not shown). For example, in an embodiment shown by FIG. 3, the electronic element 37 may comprise one or more photo detectors 41. These photo detectors 41 may detect light and convert the light into digital data that defines an image of the scene exposed to the photo detectors 41. This digital data may then be transmitted, via the antenna 33, to an external camera (not shown), which utilizes the digital data to define the image or images captured when the input or control signals transmitted from the circuitry 26 indicate that the camera should take a picture or begin recording.

Figure 4:
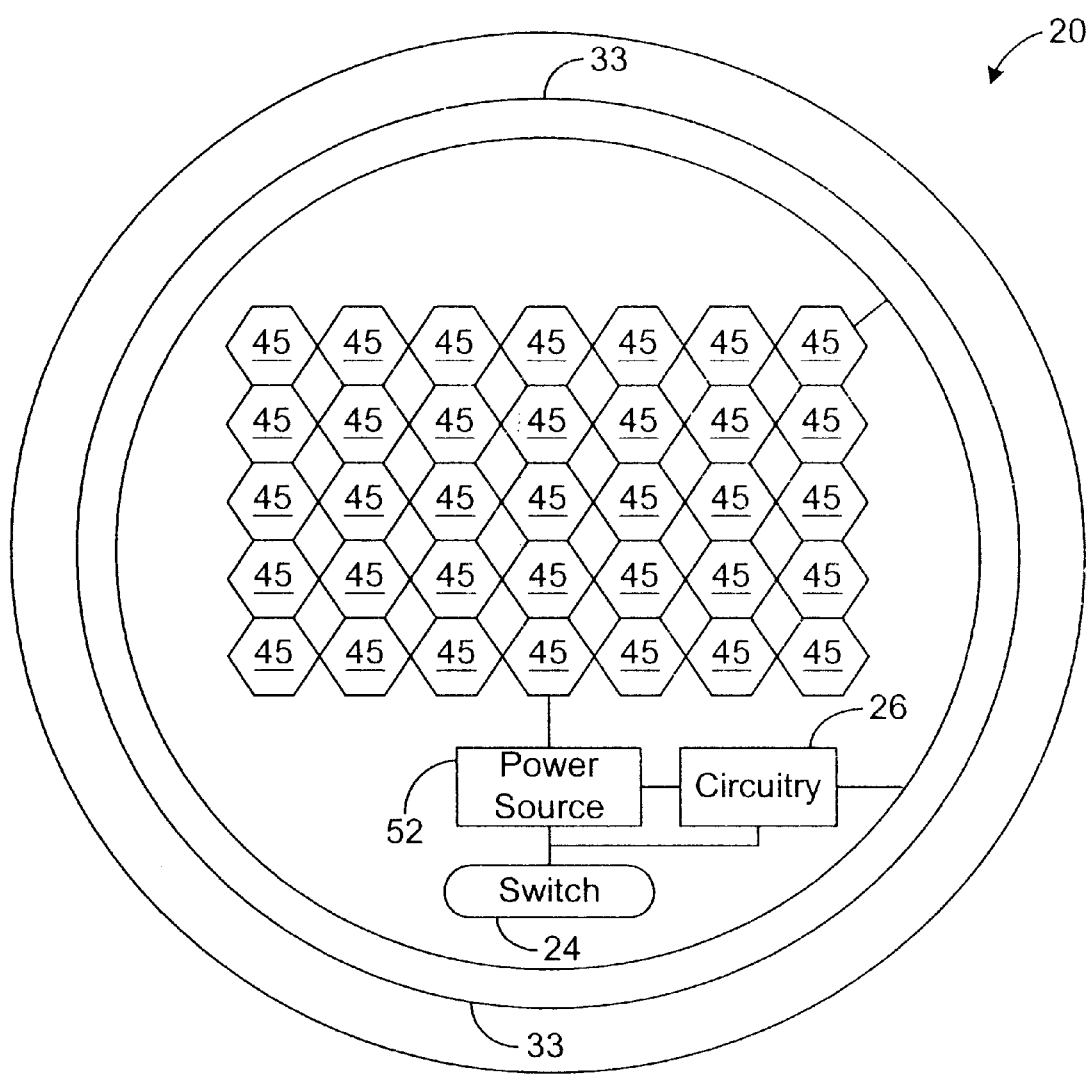
FIG. 4 is a diagram illustrating another embodiment of the apparatus depicted in FIG. 2.

In another embodiment, the photo detectors 41 may face the user's eyeball and detect light emitted from the user's eye in order to detect certain physiological conditions (e.g., pupil dilation) of the user. In yet another embodiment, the electronic element 37 may comprise one or more photo emitters 45, as shown by FIG. 4. These photo emitters 45 may be controlled by the circuitry 26 and/or by external devices (not shown) that transmit control signals to the photo emitters 45 via antenna 33. As an example, one or more photo emitters 45 may face away from the user's eye such that light emitted from the one or more photo emitters 45 can be seen by others. In this embodiment, the photo emitters 45 may be utilized to display tiny messages or images that appear to be on or within the user's eyeball. In another example, one or more photo emitters 45 may face the user's eye such that the user can see the images or messages conveyed by the one or more photo emitters 45. Note that data defining the messages or images emitted by the foregoing photo emitters 45 may be received by the antenna 33 from an external electronic device (not shown).

Figure 5:
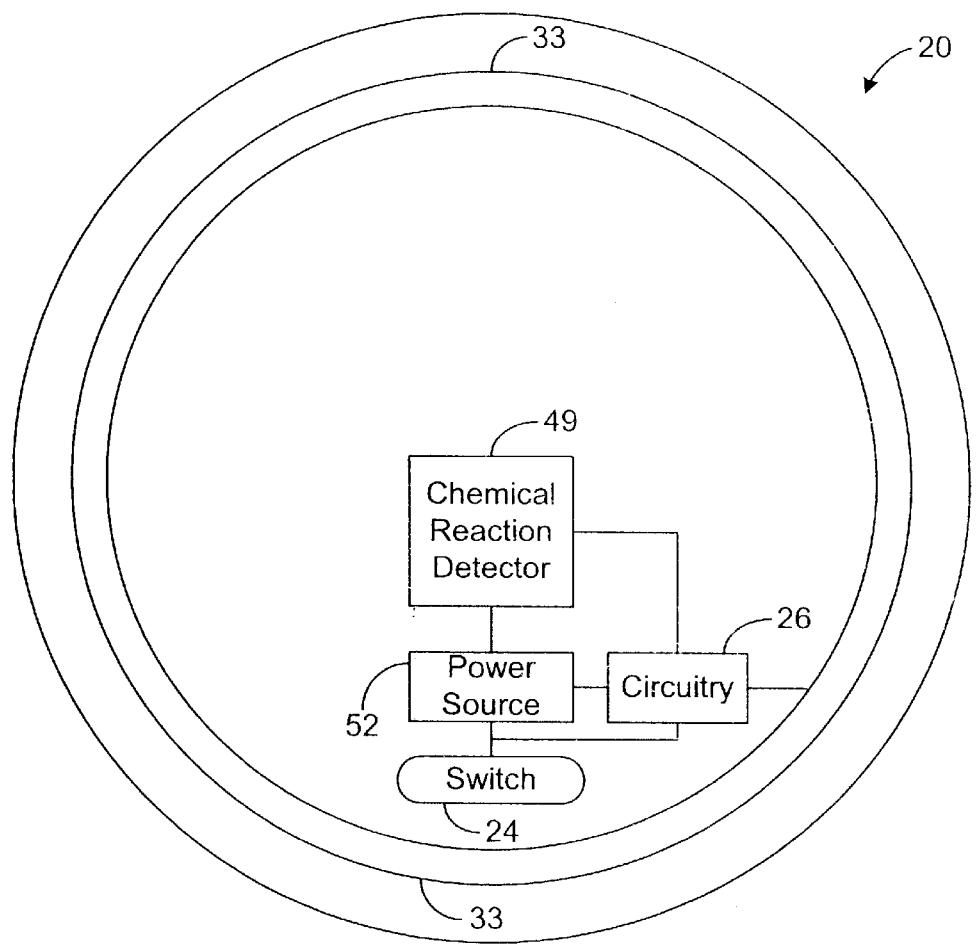
FIG. 5 is a diagram illustrating yet another embodiment of the apparatus depicted in FIG. 2.

In another embodiment, which is shown by FIG. 5, the electronic element 37 may comprise a chemical reaction detector 49, such as a galvanic reaction detector, for example. The detector 49 could be used to detect chemical reactions (e.g., galvanic responses) within the body of the user wearing the lens 20. The information provided by such a detector 49 could be used for a variety of purposes, such as, for example, controlling an external electronic device (not shown) based on the excitement level of the user.

It should be noted that the electronic element 37 may comprise various other electronic devices (e.g., sensing elements) in other embodiments. Aforementioned U.S. patent application Ser. No. 09/918,211, entitled "System and Method for Controlling Electronic Devices," describes in more detail the use of various sensing elements, including the mechanical switch 24, the antenna 33, the photo detectors 41, and the chemical reaction detector 49, within a contact lens.

Figure 6:
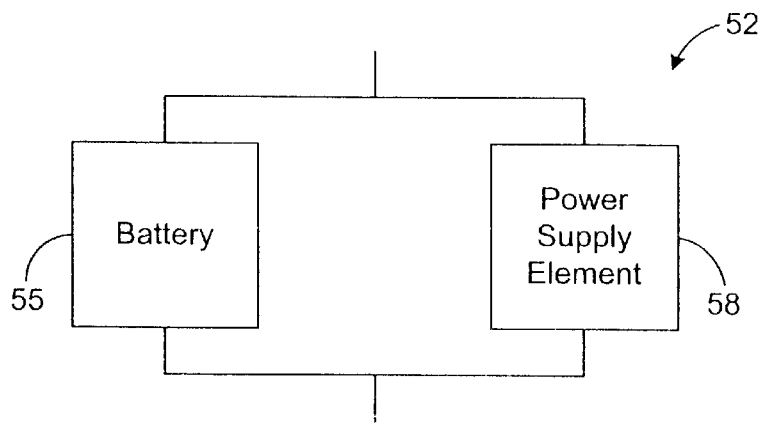
FIG. 6 is a block diagram illustrating a more detailed view of a power source depicted in FIGS. 2–5.

It should be apparent that the various components of the lens 20 may require electrical power for proper operation. A power source 52 coupled to the lens 20 may be utilized to provide the necessary power to these components. It is desirable for the power source 52 to be small (e.g., microlevel or nano-level) in order to prevent obstruction of the user's view when the lens 20 is being worn by the user and in order to enable the power source 52 to fit on and/or within the lens 20 without significantly affecting the wearability of the lens 20. As shown by FIG. 6, the power source 52 may include a conventional battery 55 for producing power to be supplied to the other components of the lens 20. As used herein, a "battery" is a device that includes a fuel cell within the device for generating energy via chemical reactions.

In the preferred embodiment, the power source 52 also includes a power supply element 58 that is capable of providing electrical energy or power via techniques that will be described in more detail hereinbelow. The power supply element 58 preferably supplements the battery 55 and, therefore, reduces the power supply burden of the battery 55. The power supply element 58 may also utilize its power to recharge the battery 55. Thus, the presence and operation of the power supply element 58 within the lens 20 may enable the use of a smaller, less powerful, and/or less expensive battery 55 and/or may increase the operational life of the battery 55. In fact, in some embodiments, the power supply element 58 may generate a sufficient amount of power for the other components of the lens 20, thereby entirely eliminating the need of the battery 55. In other embodiments, the battery 55 and power supply element 58 may simultaneously provide power to the same or different components of the lens 20, thereby sharing the power supply burden of the lens 20.

The power supply element 58 may utilize techniques similar to those employed by conventional generators to convert mechanical and/or solar energy into electrical energy or power. To decrease the cost and/or complexity of the lens 20 and/or to reduce the overall size of the components of the lens 20, the power supply element 58 may utilize one or more of the previously described components of the lens 20 as an energy source for providing mechanical and/or solar energy that can be converted into electrical energy or power by the power supply element 58.

For example, in one embodiment, the power supply element 58 may convert into electrical energy the mechanical energy created by the movement of the switch 24. In this regard, as previously described, the user's eyelid preferably engages and moves the switch 24 when the user blinks. The power supply element 58 is preferably coupled to the switch 24, and the mechanical energy created by the user's eyelid moving the switch 24 is transferred from the switch 24 to the power supply element 58, which harnesses the mechanical energy and converts it into electrical energy. Techniques for converting mechanical energy into electrical energy are generally well-known in the art. The power supply element 58 is coupled to one or more other components of the lens 20 and provides the converted electrical energy to these other components, which are partially or wholly powered by this electrical energy.

In another embodiment, the antenna 33 may be configured to have a resonant frequency that causes the antenna 33 to resonate in response to one or more signals received by the antenna 33. In this regard, if the antenna 33 receives a signal having a frequency that substantially matches the resonate frequency of the antenna 33, then the antenna 33 may resonate and, therefore, vibrate. In this embodiment, the power supply element 58 is preferably coupled to the antenna 33, and the mechanical energy from this vibration is transferred from the antenna 33 to the power supply element 58. The power supply element 58 is configured to convert the mechanical energy from the antenna 33 into electrical energy or power, which can then be used by the power supply element 58 to power the various components of the lens 20.

In such an embodiment, it is desirable to configure the antenna 33 to have a resonate frequency that substantially matches the frequency of a standing signal that is received by the antenna 33 for at least a sufficient amount of time to invoke resonance in the antenna 33 either periodically or continuously. In this regard, certain signals are continuously transmitted across vast distances. As an example, it is well known to use atomic clocks to keep accurate time. Information from such clocks are sometimes continuously transmitted via low frequency signals to enable remote users to accurately set their watches or clocks based on the information included in these low frequency signals. If the lens 20 is to be used within the range of one of these standing signals, then the antenna 33 may be configured such that its resonate frequency substantially matches the frequency of the one standing signal. As a result, the antenna 33 should continuously resonate while the antenna 33 is within the range of the one standing signal.

It should be noted that it is not necessary for the resonate frequency of the antenna 33 to match a frequency of a signal that is continuous. For example, it is possible for the antenna 33 to have a resonate frequency that substantially matches a frequency of signals that are intermittent or, in other words, continuous only during discrete time periods. In such embodiments, the antenna 33 generally should resonate only during the time periods that the antenna 33 is receiving a signal having a frequency substantially matching the antenna's resonant frequency. Moreover, in such a situation, the power supply element 58 would derive power from the antenna 33 when the antenna 33 is experiencing resonance but would derive very little or no power from the antenna 33 during other time periods.

Note that the antenna 33 could be configured to resonate in response to one or more signals that provide data to the circuitry 26 and/or another component of lens 20. For example, in the embodiment where the lens 20 includes photo emitters 45, the antenna 33 may be configured to resonate in response to a signal that includes the data defining the image to be displayed by the photo emitters 45. In such embodiments, the signal received by the antenna 33 serves a dual purpose. In this regard, such a signal communicates information that is to be utilized by one of the components of the lens 20 and causes the antenna 33 to vibrate, thereby enabling electrical power to be generated from the antenna's vibration.

In another embodiment, the power supply element 58 may be coupled to the chemical reaction detector 49. The chemical reaction detector 49, similar to other such detectors in the prior art, preferably detects a chemical reaction by detecting electrical energy generated by such a reaction. An example of such a detector is a galvanic reaction detector. Such a detector extracts electrical energy from chemical reactions and, therefore, detects an occurrence of a chemical reaction when electrical energy is passing through it. In the foregoing embodiment, the power supply element 58 may simply comprise a conductive wire that transfers the electrical energy extracted from the detected chemical reactions to one or more other lens components, which are powered by this electrical energy. If desired, the power supply element 58 may also comprise a storage element (not shown) for storing any excess electrical energy derived from the detector 49 until such energy is needed to power one of the components of the lens 20. Note that the power supply element 58 may comprise such a storage element in any of the other embodiments of the present invention for storing excess energy derived from any of the other components of the lens 20.

In yet another embodiment, the power supply element 58 may be coupled to one or more photo detectors 41, which transfer the solar energy from the light detected by the photo detectors 41 to the power supply element 58. In this embodiment, the power supply element 58 is preferably configured to convert the solar energy into electrical energy or power, which can then be used by the power supply element 58 to power the various components of the lens 20. Techniques for converting solar energy into electrical energy are generally well-known.

Figure 7:
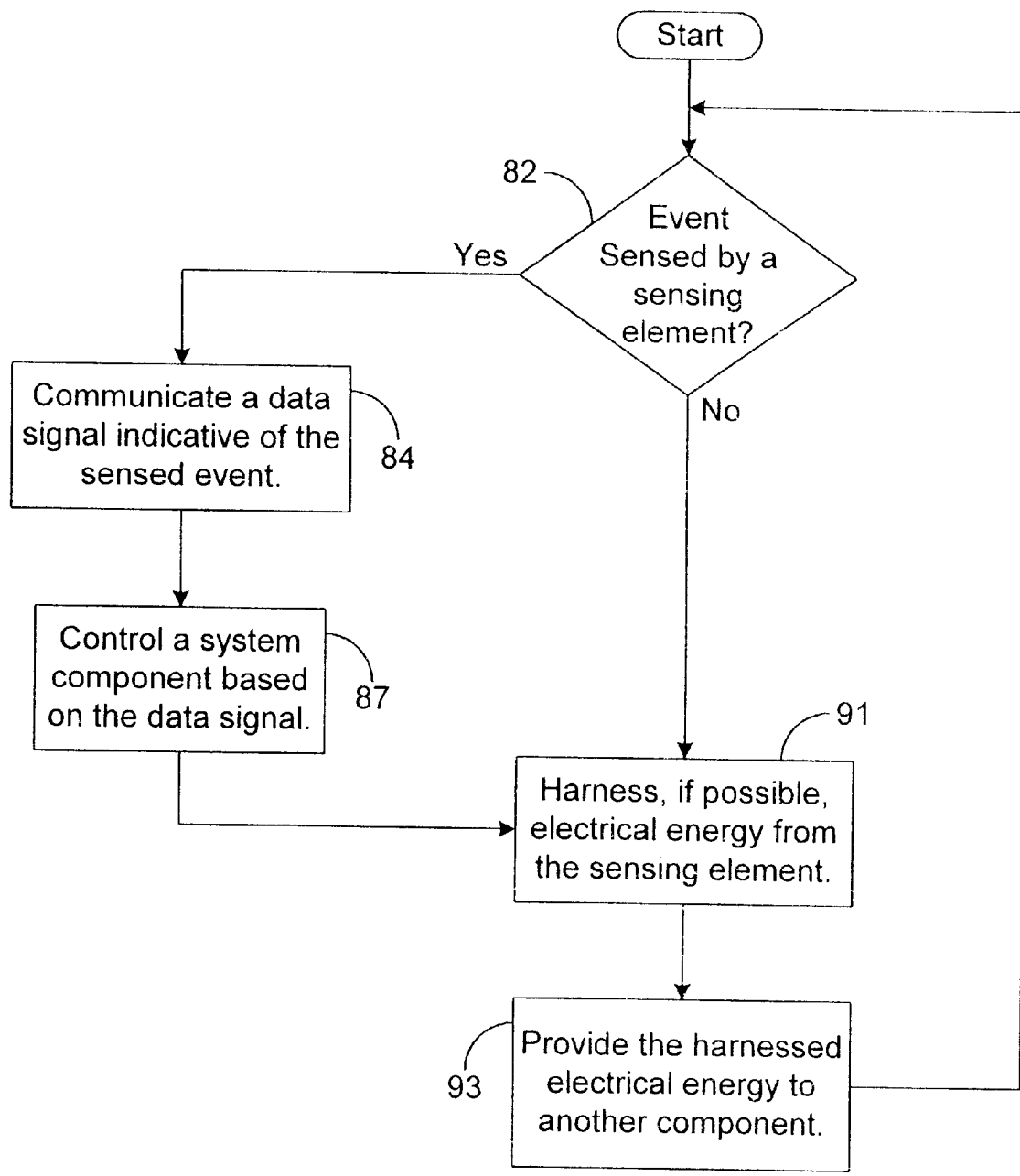
FIG. 7 is a flow chart illustrating an exemplary operation for a sensing element within any one of the embodiments depicted in FIGS. 2–5.

Thus, the electrical energy provided by the power supply element 58 for powering the various components of the lens 20 is preferably derived from one or more components that also perform a separate sensing function within the lens 20 and that communicate their sensed information to other components or devices. In this regard, as previously described above, a particular sensing element (e.g., switch 24, antenna 33, photo detector 41, or chemical reaction detector 49) may sense an occurrence of an event in block 82 of FIG. 7 and communicate, in block 84, information pertaining to the sensed event to logic, which controls a component in block 87. For example, the switch 24 may sense one or more eyelid blinks in block 84, and in response, the circuitry 26 may transmit a control signal via antenna 33 in block 87. In block 91, energy is derived from the same sensing element, and this energy is provided to one or more other components in block 93. Continuing with the foregoing example, the mechanical energy induced from activation of the switch during the sensed event, in block 91, is converted into electrical energy, which is provided to another component in block 93. Since energy is derived from the same component that also provides sensed information, the number and/or overall size of components, the complexity, and/or the cost of the lens 20 may be reduced.

In small-scale devices, such as lens 20, replacing a dead battery can be difficult or expensive. Thus, if possible, it would be desirable to power the components of such devices without utilizing a conventional battery that ultimately will need replacing. However, other types of power sources may be insufficient for powering most micro-level or nano-level devices. For example, it is not likely that the energy sources described above (e.g., the antenna 33, the switch 24, the chemical reaction detector 49, and the photo detectors 41) individually will provide sufficient energy to enable the power supply element 58 to power all of the components of most micro-level or nano-level devices, such as lens 20, for example. In such situations, the power supply element 58 can be coupled to multiple energy sources and simultaneously draw energy from each of these energy sources. The cumulative energy derived from each of these sources may be sufficient for powering a particular micro-level or nano-level device, such as lens 20, without utilizing a conventional battery 55.

For example, the power supply element 58 may be coupled to and configured to simultaneously derive electrical energy from any combination of the switch 24, the antenna 33, the photo detectors 41, and the chemical reaction detector 49. The electrical energy derived from a combination of such elements may be sufficient to significantly reduce the power burden of battery 55 or to power the various components of lens 20, thereby entirely eliminating the need of battery 55. Thus, it may be desirable for the power supply element 58 to derive energy simultaneously from multiple components of the lens 20 in order to reduce or eliminate the power burden of battery 55.

Further, there may be other types of components, in other embodiments, that could be utilized by the power supply element 58 to derive energy. It is possible to replace one or more of the foregoing energy source components (i.e., switch 24, antenna 33, photo detectors 41, or chemical reaction detector 49) with another type of energy source component that has not specifically been described herein, and the power supply element 58 could be configured to derive power from such component in whole or in part.

It should be further noted that employing the present invention within lens 20 is not a necessary feature of the present invention, and other types of devices, particularly other types of small-scale devices, may be powered via techniques similar to those described herein in order to eliminate the need of including conventional batteries in such devices or extending the operational life of batteries included in such devices. Indeed, some of the same energy source components described herein (i.e., switch 24, antenna 33, chemical reaction detector 49, and/or photo detectors 41) may be utilized to power such devices in whole or in part.

Now, therefore, the following is claimed:

1. A system, comprising:
   an electronic component;
   a sensing element coupled to said electronic component, said sensing element configured to sense an occurrence of an event, said sensing element further configured to transmit a data signal indicative of said occurrence;
   a power supply element configured to receive energy from said sensing element and to power said electronic component with electrical energy, said electrical energy derived from said energy received from said sensing element; and
   logic configured to receive said data signal from said sensing element and to control operation of a component of said system based on a value of said data.

2. The system of claim 1, wherein said occurrence is a detection of light by said sensing element, wherein said received energy is solar energy from said light, and wherein said power supply element is configured to convert said solar energy into said electrical energy.

3. The system of claim 1, wherein said sensing element comprises a mechanical switch, wherein said occurrence is an activation of said switch, wherein said received energy is mechanical energy induced from said activation, and wherein said power supply element is configured to convert said mechanical energy into said electrical energy.

4. The system of claim 1, further comprising a contact lens coupled to said sensing element, said electronic component, and said power supply element.

5. The system of claim 1, wherein said sensing element comprises a mechanical switch positioned such that said switch is engaged by and moved by an eyelid of a user wearing said contact lens when said user blinks said eyelid.

6. The system of claim 1, wherein said sensing element is configured to extract said received energy from another occurrence of said event.

7. The apparatus of claim 1, wherein said sensing element comprises an antenna, wherein said occurrence is a reception of a signal by said antenna, wherein said received energy is mechanical energy induced via vibration of said antenna, and wherein said power supply element is configured to convert said mechanical energy into said electrical energy.

8. The system of claim 1, wherein said sensing element is configured to extract said received energy from said occurrence.

9. The system of claim 8, wherein said occurrence is a chemical reaction, and wherein said received energy is generated from said chemical reaction.

10. The system of claim 8, wherein said occurrence is a chemical reaction within a human body, and wherein said received energy is generated from said chemical reaction.

11. A system, comprising:
    an electronic component;
    a non-battery means for sensing an occurrence of an event and for providing electrical energy to said electronic component, said non-battery means configured to transmit a data signal indicative of said occurrence; and
    logic configured to receive said data signal and to control operation of a component of said system based on a value of said data signal.

12. The system of claim 11, further comprising a contact lens coupled to said electronic component and to said non-battery means.

13. A method, comprising the steps of:
    providing an apparatus having a sensing element and an electronic component;
    sensing an occurrence of an event via said sensing element;
    transmitting a data signal from said sensing element in response to said occurrence;
    controlling said apparatus based on a value of said data signal;
    harnessing electrical energy via said sensing element; and
    providing said electrical energy to said electronic component.

14. The method of claim 13, wherein said occurrence is a detection of light by said sensing element, and wherein said method further comprises the step of:
    converting solar energy from said light into said electrical energy.

15. The method of claim 14, wherein said harnessing step comprises the step of extracting said electrical energy from said occurrence.

16. The method of claim 15, wherein said occurrence is a chemical reaction, and wherein said electrical energy is generated from said chemical reaction.

17. The method of claim 15, wherein said occurrence is a chemical reaction within a human body, and wherein said electrical energy is generated from said chemical reaction.

18. The method of claim 13, wherein said sensing element comprises a mechanical switch, and wherein said method further comprises the steps of:

activating said mechanical switch; and converting mechanical energy induced via said activating step into said electrical energy.

19. The method of claim 13, wherein said apparatus comprises a contact lens.

20. The method of claim 13, wherein said harnessing step comprises the step of extracting said electrical energy from another occurrence of said event.

21. The method of claim 13, wherein said sensing element comprises an antenna, wherein said occurrence is a reception of a signal via said antenna, and wherein said method further comprises the step of:

resonating said antenna; and converting mechanical energy induced via said resonating step into said electrical energy.

22. The method of claim 21, wherein said resonating step is performed in response to another signal received by said antenna.

* * * * *